US012711356B2

(12) United States Patent
Kuusela

(10) Patent No.: US 12,711,356 B2
(45) Date of Patent: Aug. 18, 2026

(54) GENERATION AND APPLICATION OF RADIATION DOSAGE BASED ON NEURAL NETWORK ARCHITECTURE

(71) Applicant: Siemens Healthineers International AG, Steinhausen (CH)

(72) Inventor: Esa Kuusela, Espoo (FI)

(73) Assignee: Siemens Healthineers International AG, Steinhausen (CH)

( * ) Notice: Subject to any disclaimer, the term of this patent is extended or adjusted under 35 U.S.C. 154(b) by 682 days.

(21) Appl. No.: 18/194,216

(22) Filed: Mar. 31, 2023

(65) Prior Publication Data

US 2024/0330653 A1 Oct. 3, 2024

(51) Int. Cl.
*G06N 3/045* (2023.01)
*G06N 3/084* (2023.01)

(52) U.S. Cl.
CPC ............. *G06N 3/045* (2023.01); *G06N 3/084* (2013.01)

(58) Field of Classification Search
CPC ......... G06N 3/045; G06N 3/084; A61N 5/103
See application file for complete search history.

(56) References Cited

U.S. PATENT DOCUMENTS 4,437,006 A * 3/1984 Morgan ............... A61B 6/4241 250/363.02
2005/0213706 A1* 9/2005 Raymond ............ H05K 1/0266 378/97
2007/0087564 A1* 4/2007 Speakman ........ H01M 10/0436 438/674
2017/0209715 A1* 7/2017 Ruebel ................. A61N 5/1067
2017/0216632 A1* 8/2017 Lee ...................... A61N 5/1049
2018/0189631 A1* 7/2018 Sumbul .................. G06N 3/049
2020/0155868 A1 5/2020 Yuan et al.
2020/0284883 A1* 9/2020 Ferreira ................ G01S 7/4815
2022/0126116 A1 4/2022 Harrer et al.
2022/0305291 A1* 9/2022 Hibbard ............... A61N 5/1039
2023/0285774 A1* 9/2023 Chen ...................... G16H 20/40

OTHER PUBLICATIONS

International Search Report dated Jun. 17, 2024 on PCT App. PCT/EP2024/057270 (14 pages).

* cited by examiner

*Primary Examiner* — Angelica Ruiz
(74) *Attorney, Agent, or Firm* — Foley & Lardner LLP

(57) ABSTRACT

Aspects of this technical solution can include generating, by a processor, a non-linear output of a layer of a first model including a first neural network, the layer of the first model including a non-linear operator and corresponding to a distribution of matter, generating, by the processor, a linear output based on a layer of a second model including a second neural network and the non-linear output, the layer of the second model including a linear operator and corresponding to a plurality of beams respectively configured to generate radiation, outputting, by the processor and based on the linear response, an indication of a distribution of energy output by the plurality of beams to correspond to the distribution of matter, and causing, by the processor, one or more of the plurality of beams to output radiation according to the distribution of energy output.

20 Claims, 9 Drawing Sheets

700

Figure 2:
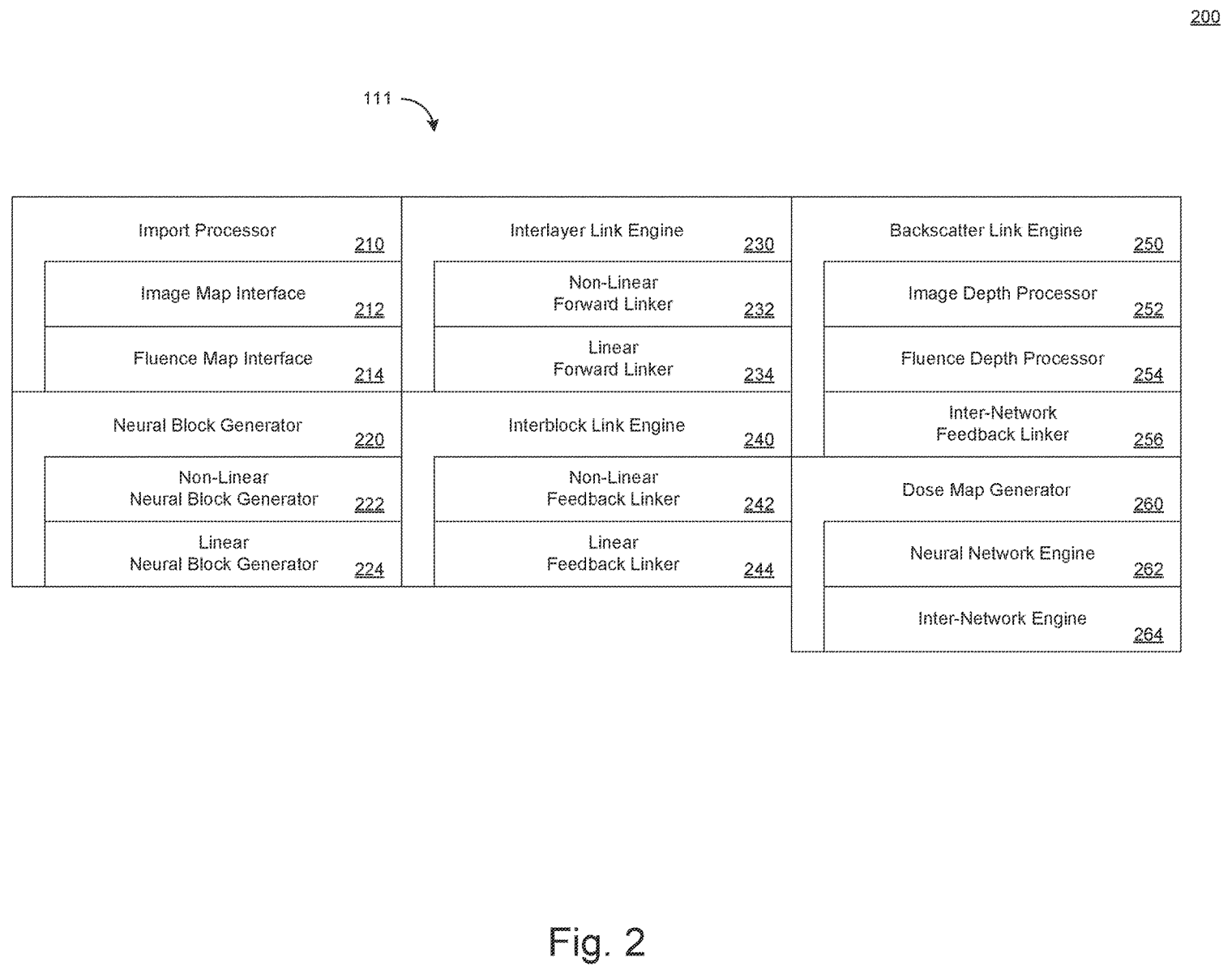

200

111

Import Processor 210

Image Map Interface 212

Fluence Map Interface 214

Neural Block Generator 220

Non-Linear Neural Block Generator 222

Linear Neural Block Generator 224

Interlayer Link Engine 230

Non-Linear Forward Linker 232

Linear Forward Linker 234

Interblock Link Engine 240

Non-Linear Feedback Linker 242

Linear Feedback Linker 244

Backscatter Link Engine 250

Image Depth Processor 252

Fluence Depth Processor 254

Inter-Network Feedback Linker 256

Dose Map Generator 260

Neural Network Engine 262

Inter-Network Engine 264

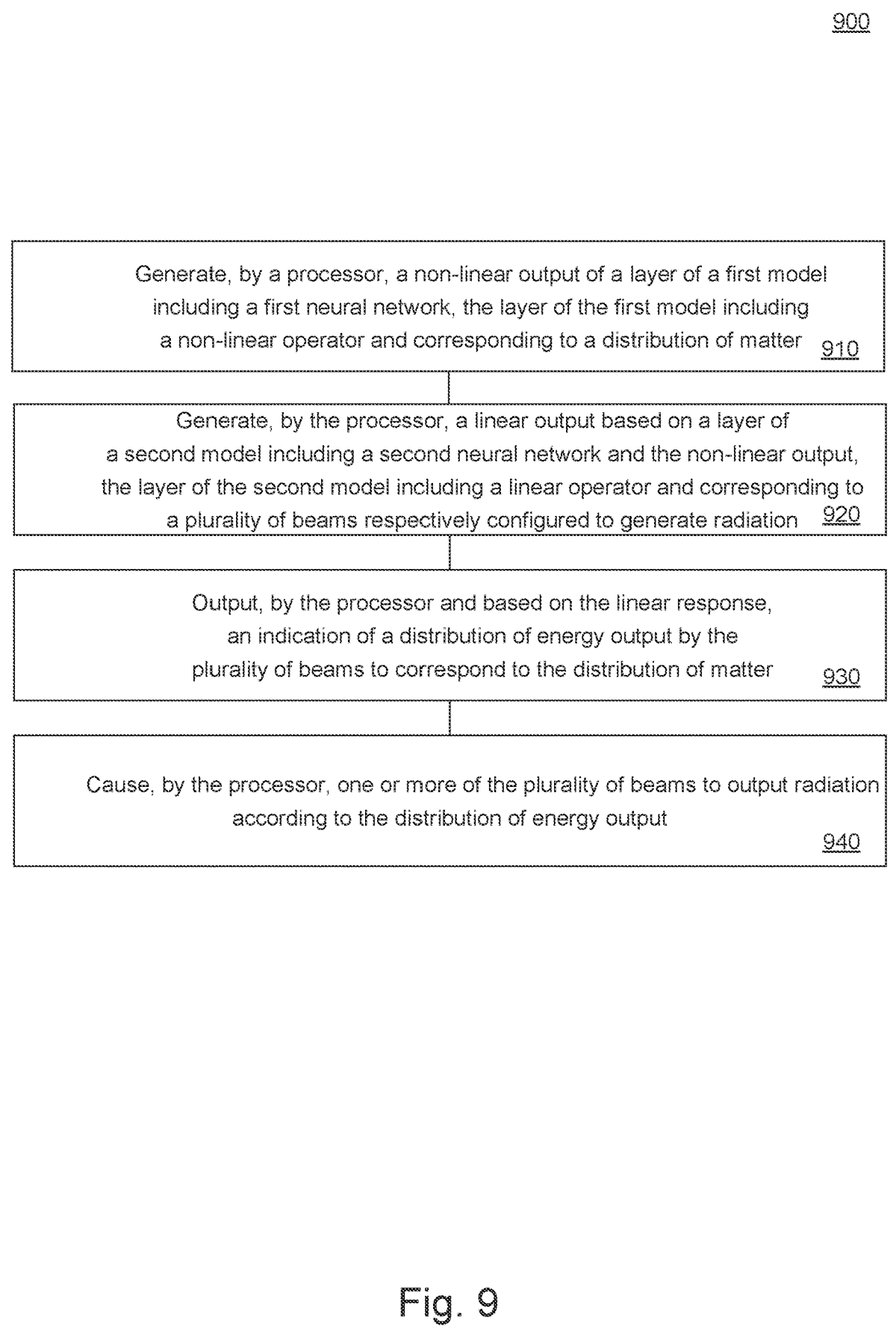

Generate, by a processor, a non-linear output of a layer of a first model including a first neural network, the layer of the first model including a non-linear operator and corresponding to a distribution of matter 910

Generate, by the processor, a linear output based on a layer of a second model including a second neural network and the non-linear output, the layer of the second model including a linear operator and corresponding to a plurality of beams respectively configured to generate radiation 920

Output, by the processor and based on the linear response, an indication of a distribution of energy output by the plurality of beams to correspond to the distribution of matter 930

Cause, by the processor, one or more of the plurality of beams to output radiation according to the distribution of energy output 940

Fig. 9

GENERATION AND APPLICATION OF RADIATION DOSAGE BASED ON NEURAL NETWORK ARCHITECTURE

TECHNICAL FIELD

The present implementations relate generally to radiotherapy devices, including but not limited to generation and application of radiation dosage based on a neural network architecture.

BACKGROUND

Radiation therapy is a complex process that contains specific guidelines, protocols and instructions adopted by different medical professionals, such as clinicians, medical device manufacturers, treating physicians, and the like. Due to the extreme nature of radiation emitted from radiotherapy machines, it is imperative that all the instructions are precisely followed.

Some conventional methods use artificial intelligence modeling, such as neural network, to calculate various treatment attribute. However, conventional AI-backed methods suffer from various technical challenges. For instance, when using neural networks to model the dose calculation process, conventional neural networks obtain their expressivity from non-linear components and thus the linear property of the dose calculation is not conserved. The utility of quick optimization-time dose engines as replacements has been reduced as a result.

Neural networks provide conversion from fluence to 3D dose distribution during optimization. In addition to potential speed-ups, they have the potential to be trained based on example dose distributions, which can be obtained via measurements or with much slower Monte-Carlo methods. However, conventional neural networks solely rely on non-linear activation layers. This causes the final output of the network to be non-linear, which causes highly inaccurate modeling of radiation dosage which behaves linearly. Because of the mismatch between non-linear and linear models, a large training set of variable fluence maps is needed in addition to variable patient geometries to approximate linearity, or the neural network must be restricted to a single beamlet at a time, which significantly degrades performance.

SUMMARY

This technical solution is directed at least to a neural network model architecture to generate and instruction parameters for application of radiation to a biological structure. The neural network architecture can generate an output compatible with an array of radiation emitting devices arranged in a grid, for example. The neural network architecture can generate an output based on characteristics of a biological structure and characteristics of radiation that can be emitted by one or more radiation emitting devices of the array of radiation emitting devices. For example, the neural network architecture can include a first neural network having a plurality of layers corresponding to a volume of a biological structure, and a second neural network architecture corresponding to a response by an array of radiation emitting devices in a volume corresponding to the volume of the biological structure. For example, a biological structure can correspond to an in vivo portion of a patient or organism. The technical solution can instruct the array to operate the radiation emitting devices according to an output of the plurality of neural networks. Thus, a technical solution for generation and application of radiation dosage based on a neural network architecture is provided.

At least one aspect is directed to a method. The method can include generating, by a processor, a non-linear output of a layer of a first model that can include a first neural network, where the layer of the first model can include a non-linear operator and correspond to a distribution of matter. The method can include generating, by the processor, a linear output based on a layer of a second model that can include a second neural network and the non-linear output, where the layer of the second model can include a linear operator and correspond to a plurality of beams respectively configured to generate radiation. The method can include outputting, by the processor and based on the linear response, an indication of a distribution of energy output by the plurality of beams to correspond to the distribution of matter. The method can include causing, by the processor, one or more of the plurality of beams to output radiation according to the distribution of energy output.

For example, the method can include inputting, by the processor to the layer of the first model, a non-linear feedback corresponding to the non-linear output. For example, the method can include inputting, by the processor to the layer of the second model, a linear feedback corresponding to the linear output. For example, the method can include inputting, by the processor to the layer of the second model, a non-linear feedback corresponding to the non-linear output, the non-linear feedback corresponding to a response by the distribution of matter to the distribution of energy. For example, in the method the layer of the first model can correspond to a two-dimensional portion of the distribution of matter at a first distance from source within the distribution of matter. For example, in the method the layer of the second model can correspond to a two-dimensional portion of the distribution of energy at the first distance from source within the distribution of matter. For example, in the method the layer of the second model can correspond to a two-dimensional portion of the distribution of energy at a second distance from source within the distribution of matter. For example, in the method can include the first distance from source can be greater than the second distance from source. For example, in the method one or more of the first neural network and the second neural network can correspond to a recursive neural network.

At least one aspect is directed to a system. The system can include a server with a processor and a non-transitory computer-readable medium containing instructions that can be executed by the processor. The system can generate a non-linear output of a layer of a first model that can include a first neural network, where the layer of the first model can include a non-linear operator and correspond to a distribution of matter. The system can generate a linear output based on a layer of a second model that can include a second neural network and the non-linear output, where the layer of the second model can include a linear operator and correspond to a plurality of beams respectively configured to generate radiation. The system can output, based on the linear response, an indication of a distribution of energy output by the plurality of beams to correspond to the distribution of matter. The system can cause one or more of the plurality of beams to output radiation according to the distribution of energy output.

For example, the system can input, to the layer of the first model, a non-linear feedback corresponding to the nonlinear output. For example, the system can input, to the layer of the second model, a linear feedback corresponding to the linear output. For example, the system can input, to the layer of the second model, a non-linear feedback corresponding to the non-linear output, the non-linear feedback corresponding to a response by the distribution of matter to the distribution of energy. For example, in the system the layer of the first model can correspond to a two-dimensional portion of the distribution of matter at a first distance from source within the distribution of matter. For example, in the system the layer of the second model can correspond to a two-dimensional portion of the distribution of energy at the first distance from source within the distribution of matter. For example, in the system the layer of the second model can correspond to a two-dimensional portion of the distribution of energy at a second distance from source within the distribution of matter. For example, in the system can include the first distance from source can be greater than the second distance from source. For example, in the system one or more of the first neural network and the second neural network can correspond to a recursive neural network.

At least one aspect is directed to a system that can include a computer in communication with a server and configured to display a graphical user interface. The system can include a radiotherapy machine in communication with the server. The system can include the server. The system can generate a non-linear output of a layer of a first model can include a first neural network, the layer of the first model can include a non-linear operator and corresponding to a distribution of matter. The system can generate a linear output based on a layer of a second model that can include a second neural network and the non-linear output, where the layer of the second model can include a linear operator and correspond to a plurality of beams respectively configured to generate radiation. The system can output, based on the linear response, an indication of a distribution of energy output by the plurality of beams to correspond to the distribution of matter. The system can cause one or more of the plurality of beams to output radiation according to the distribution of energy output.

For example, the system can input, to the layer of the first model, a non-linear feedback corresponding to the non-linear output. The system can input, to the layer of the second model, a linear feedback corresponding to the linear. The system can input, to the layer of the second model, a non-linear feedback corresponding to the non-linear output, the non-linear feedback corresponding to a response by the distribution of matter to the distribution of energy.

BRIEF DESCRIPTION OF THE FIGURES

These and other aspects and features of the present implementations are depicted by way of example in the figures discussed herein. Present implementations can be directed to, but are not limited to, examples depicted in the figures discussed herein.

FIG. 2 depicts an example neural network model, in accordance with present implementations.

FIG. 9 depicts an example method of generation and application of radiation dosage based on a neural network architecture, in accordance with present implementations.

DETAILED DESCRIPTION

Figure 1:
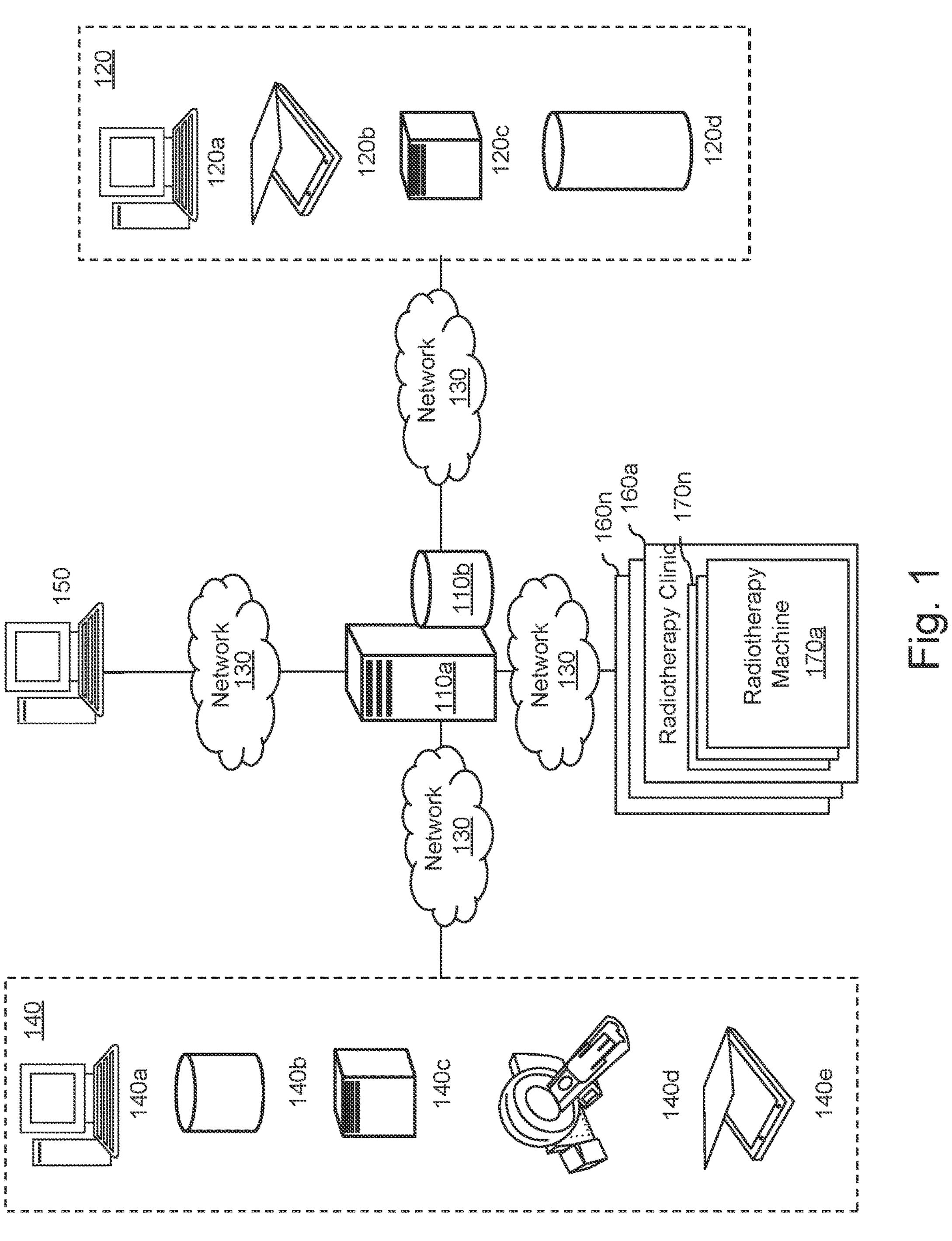
FIG. 1 depicts components of a treatment attribute identification system, in accordance with present implementations.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

Linearity is a powerful concept in dose calculation, where doses from two subfields can be summed together and obtain the dose of the sum of the subfields. For example, can be based on the approximation that the 3D dose distribution of the incoming photon (or particle) flux is a linear function of the fluence—or similar degrees-of-freedom describing the particle flux. For example, fluence can be into multiple parts to obtain a same result either for a dose calculated for an original fluence or for partial fluences separately. Exclusively non-linear neural networks, or pluralities of neural networks lacking a linear neural network, can result in inaccurate modeling of radiation within a 3D volume and significant increases in computational processing involved to accurately model radiation within a 3D volume. Thus, time to generate and apply output via an array of radiation emitting devices can be significantly increased, causing both wasted computational resources, and inefficiencies in deployment of radiotherapy methods, treatments, and operations.

By implementing the systems and methods described herein, a system may resolve these deficiencies by enabling a neural network architecture including a non-linear neural network and a linear neural network. The non-linear neural network can include a plurality of non-linear neural network layers, and the linear neural network can include a plurality of linear neural network layers. The layers of non-linear neural network and the linear neural network can be linked by various links to transmit output from one layer to input of another layer. For example, one or more layers of the non-linear neural network can provide output to one or more layers of the linear neural network. Each layer can, for example, correspond to a particular plane at a particular distance from source within a three-dimensional (3D) volume. Each layer of the non-linear neural network can correspond to a particular plane at a particular distance from source of a biological structure, and each layer of the linear neural network can correspond to an output of an array of radiation emitting devices at particular plane at a particular distance from source of the biological structure.

Advantageously, by implementing the systems and methods described herein, a system may avoid the costs and processing resources that are typically required to generate large curated training data sets using data generated from data sources with a low amount of training data such as individual clinics. Thus, a neural network architecture can generate a dose calculation based on input including both fluence of an array of radiation emitting devices with respect to a biological structure, and the biological structure. For example, the neural network architecture can be linear with respect to the fluence.

As will be described below, a central server (referred to herein as the analytics server) can train a neural network or other machine learning model using patient data from one or more radiotherapy clinics that utilize sets of radiotherapy machines. In a non-limiting example, the central server may transfer, or a processor of a local clinic may otherwise access, the trained neural network to a processor associated with the local clinic for calibration to the population at the clinic. Upon being calibrated, the neural network may predict treatment attributes that the clinicians and/or radiotherapy machines at the local clinic may use for patient treatment. FIG. 1 is a non-limiting example of components of a system in which the analytics server operates.

FIG. 1 illustrates components of a treatment attribute identification system 100. The system 100 may include an analytics server 110*a*, system database 110*b*, electronic data sources 120*a-d* (collectively electronic data sources 120), end-user devices 140*a-e* (collectively end-user devices 140), an administrator computing device 150, and radiotherapy clinics 160*a-n* (collectively radiotherapy clinics 160). The radiotherapy clinics 160 may be clinics at which patients may receive radiotherapy treatment, in some cases via one or more radiotherapy machines located within the clinic. The above-mentioned components may be connected to each other through a network 130. Examples of the network 130 may include, but are not limited to, private or public LAN, WLAN, MAN, WAN, and the Internet. The network 130 may include wired and/or wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The system 100 is not confined to the components described herein and may include additional or other components, not shown for brevity, which are to be considered within the scope of the embodiments described herein.

The analytics server 110*a* may generate and display an electronic platform configured to use various computer models (including artificial intelligence and/or machine learning models) to identify and display treatment attributes (e.g., RTTP treatment attributes). The electronic platform may include graphical user interfaces (GUI) displayed on each electronic data source 120, the end-user devices 140, and/or the administrator computing device 150. An example of the electronic platform generated and hosted by the analytics server 110*a* may be a web-based application or a website configured to be displayed on different electronic devices, such as mobile devices, tablets, personal computer, and the like. In a non-limiting example, a physician operating the physician device 120*b* may access the platform, input patient attributes or characteristics and other data, and further instruct the analytics server 110*a* to generate an optimized RTTP. The analytics server 110*a* may utilize the methods and systems described herein to generate a treatment attribute and display the results on the end-user devices (e.g., the radiotherapy machine 140*d*) or adjust the configuration of one of end-user devices 140. The analytics server 110*a* may display the treatment attribute on the physician device 120*b* itself as well.

As described herein, treatment attributes may be or include any attributes related to treating patients at a radiotherapy clinic and/or using a radiotherapy machine. Treatment attributes may include, but are not limited to, different treatment modalities, field geometry settings for external beam radiotherapy, side effect predictions, organ and/or tumor segmentation, machine therapy attributes, dosage administration attributes (e.g., dosage amount), treatment frequency, treatment timing, etc. A system implementing the systems and methods described herein may provide calibrated predictions for one or more of any such treatment attributes for clinicians and/or radiotherapy machines to implement to treat patients.

The analytics server 110*a* may host a website accessible to users operating any of the electronic devices described herein (e.g., end users), where the content presented via the various webpages may be controlled based upon each particular user's role or viewing permissions. The analytics server 110*a* may be any computing device comprising a processor and non-transitory machine-readable storage capable of executing the various tasks and processes described herein. Non-limiting examples of such computing devices may include workstation computers, laptop computers, server computers, and the like. While the system 100 includes a single analytics server 110*a*, the analytics server 110*a* may include any number of computing devices operating in a distributed computing environment, such as a cloud environment.

The analytics server 110*a* may execute software applications configured to display the electronic platform (e.g., host a website), which may generate and serve various webpages to each electronic data source 120 and/or end-user devices 140. Different users may use the website to view and/or interact with the predicted results.

The analytics server 110*a* may be configured to require user authentication based upon a set of user authorization credentials (e.g., username, password, biometrics, cryptographic certificate, and the like). The analytics server 110*a* may access the system database 110*b* configured to store user credentials, which the analytics server 110*a* may be configured to reference in order to determine whether a set of entered credentials (purportedly authenticating the user) match an appropriate set of credentials that identify and authenticate the user.

The analytics server 110*a* may also store data associated with each user operating one or more electronic data sources 120 and/or end-user devices 140. The analytics server 110*a* may use the data to weigh interactions while training various AI models accordingly. For instance, the analytics server 110*a* may indicate that a user is a medical professional whose inputs may be monitored and used to train the machine learning or other computer models described herein.

The analytics server 110*a* may generate and host webpages based upon a particular user's role within the system 100. In such implementations, the user's role may be defined by data fields and input fields in user records stored in the system database 110*b*. The analytics server 110*a* may authenticate the user and may identify the user's role by executing an access directory protocol (e.g. LDAP). The analytics server 110*a* may generate webpage content that is customized according to the user's role defined by the user record in the system database 110*b*.

The analytics server 110*a* may receive RTTP data (e.g., patient and treatment data) from a user or retrieve such data from a data repository, analyze the data, and display the results on the electronic platform. For instance, in a non-limiting example, the analytics server 110*a* may query and retrieve medical images from the database 120*d* and combine the medical images with RTTP data received from a physician operating the physician device 120*b*. The analytics server 110*a* may then use various models (stored within the system database 110*b*) to analyze the retrieved data. The analytics server 110*a* then displays the results (e.g., RTTP including couch and gantry angles) via the electronic platform on the administrator computing device, the electronic physician device 120*b*, and/or the end-user devices 140.

The electronic data sources 120 may represent various electronic data sources that contain, retrieve, and/or input data associated with RTTP (e.g., patient data and treatment data). For instance, the analytics server 110*a* may use the clinic computer 120*a*, physician device 120*b*, server 120*c* (associated with a physician and/or clinic), and database 120*d* (associated with the physician and/or the clinic) to retrieve/receive RTTP data associated with a particular patient's treatment plan.

End-user devices 140 may be any computing device comprising a processor and a non-transitory machine-readable storage medium capable of performing the various tasks and processes described herein. Non-limiting examples of an end-user device 140 may be a workstation computer, laptop computer, tablet computer, and server computer. In operation, various users may use end-user devices 140 to access the GUI operationally managed by the analytics server 110*a*. Specifically, the end-user devices 140 may include clinic computer 140*a*, clinic database 140*b*, clinic server 140*c*, a medical device, such as a CT scan machine, radiotherapy machine (e.g., a linear accelerator or a cobalt machine), and the like (140*d*), and a clinic device 140*e*.

The administrator computing device 150 may represent a computing device operated by a system administrator. The administrator computing device 150 may be configured to display data retrieved, treatment attributes generated by the analytics server 110*a* (e.g., various analytic metrics and/or field geometry) where the system administrator can monitor various models utilized by the analytics server 110*a*, electronic data sources 120, and/or end-user devices 140; review feedback; and/or facilitate training or calibration of the neural networks that are maintained by the analytic server 110*a*.

In operation, a physician may access an application executing on the physician device 120*b* and input RTTP data (e.g., patient information, patient diagnosis, radiation therapy treatment attributes, etc.). The analytics server 110*a* may then use a patient identifier to query patient data (e.g., patient anatomy and/or medical images) from the electronic data sources 120. The analytics server may then identify a clinic associated with the patient (e.g., clinic performing the treatment) and retrieve the neural network that is associated with the clinic (e.g., the neural network that has been calibrated based on a representative set of patient data of the clinic) based on a clinic identifier (e.g., an alphanumerical or numerical identifier that is associated with the clinic). The analytics server 110*a* may then utilize the systems and methods described herein to generate an optimized/uniform RTTP and display the results onto the physician device 120*b*, clinic computer 140*a*, and/or the medical device 140*d* (e.g., a display screen of the radiotherapy machine).

The analytics server 110*a* may be in communication (real-time or near real-time) with the medical device 140*d*, such that a server/computer hosting the medical device 140*d* can adjust the medical device 140*d* based on the treatment attributes generated by the analytics server 110*a*. For instance, the radiotherapy machine may adjust the gantry and couch based on angles and other attributes determined by the analytics server 110*a*. The analytics server 110*a* may transmit instructions to the radiotherapy machines indicating any number or type of treatment attributes (e.g., field geometry settings) to facilitate such adjustments.

The analytics server 110*a* may store machine learning models (e.g., neural networks, random forest, support vector machines, etc.), that are trained to predict treatment attributes to treat patients at radiotherapy clinics. The analytics server 110*a* may train the machine learning models using patient data of patients that are treated at radiotherapy machines 170*a-n* of the radiotherapy clinics 160. For instance, the analytics server 110*a* may receive patient data from processors of the radiotherapy clinics 160 and generate one or more sets of labeled training data indicating treatment attributes that were used to treat the patients at the respective radiotherapy clinics 160. The analytics server 110*a* may input the set of labeled training data into the stored machine learning models for supervised training to teach the machine learning models to predict confidence scores for treatment attributes for patient treatment. The analytics server 110*a* may continue to feed the training data into the machine learning models until the machine learning models are accurate to a threshold and store the models in a database of the analytics server 110*a*.

The machine learning models stored in the analytics server 110*a* may correspond to individual radiotherapy clinics or otherwise different sets of radiotherapy machines (e.g., radiotherapy machines that are located at individual radiotherapy clinics, are located in different geographical regions, treat specific types of diseases (e.g., different type of cancers), treat specific genders, etc.). For example, each machine learning model may be associated with an identifier indicating the radiotherapy clinic or set of radiotherapy machines for which it is configured to determine or deliver a radiation dosage for treatment attributes.

FIG. 2 depicts an example neural network model, in accordance with present implementations. As illustrated by way of example in FIG. 2, an example neural network model 200 can include at least an import processor 210, a neural block generator 220, an interlayer link engine 230, an interblock link engine 240, a backscatter link engine 250, and a dose map generator 260.

The import processor 210 can obtain one or more maps corresponding to a patient body volume or corresponding to a radiation response customized to a patient body volume. For example, a patient body volume can correspond to a biological structure of a patient, including one or more of skin, muscle, connective tissue, organs, bone, or any combination thereof. The import processor 210 can obtain the maps via, for example, an application programming interface (API) coupled with or that can be coupled with a storage device as discussed herein. The import processor 210 can include an image map interface 212, and a fluence map interface 214. The image map interface 212 can obtain an image map corresponding to a particular biological structure. The image map interface 212 can include an API or a channel of an API to obtain the image map according to a particular patient metric or patient identifier. The fluence map interface 214 can obtain a fluence map corresponding to response by particular biological features at particular locations corresponding to the particular biological structure. The fluence map interface 214 can include an API or a channel of an API to obtain the fluence map according to a particular patient metric or patient identifier. The API of the fluence map interface 214 can be distinct from the API of the image map interface 212.

The neural block generator 220 can generate one or more neural network layers including one or more operations configured to determine one or more features or responses with respect to a biological structure. For example, the neural block generator 220 can generate one or more non-linear neural network layers. The neural block generator 220 can include a non-linear neural block generator 222, and a linear neural block generator 224. As discussed herein, a block of a neural network and a layer of the neural network can be used interchangeably. The non-linear neural block generator 222 can generate one or more non-linear blocks to identify aspects, structures, features, or any combination thereof, corresponding to a 2D image.

The linear neural block generator 224 can generate one or more linear blocks to identify aspects, features, responses, or any combination thereof, corresponding to a 2D image. For example, the linear neural block generator 224 can correspond to a response at a particular distance from source of a biological structure to radiation stimulation applied at that distance from source. The linear neural block generator 224 can generate a block to obtain one or more inputs from one or more non-linear blocks corresponding to a 2D image, and one or more inputs from one or more linear blocks corresponding to input radiation at the 2D distance from source. The linear neural block generator 224 can generate linear blocks to output an indication of radiation emitted from the distance from source to a lower distance from source corresponding to a beam penetration into the biological structure. The linear neural block generator 224 can generate linear blocks to output an indication of radiation emitted from the distance from source to a higher distance from source corresponding to a beam backscatter from the biological structure outward toward the beam or in a direction at least partially toward the beam. For example, the response can correspond to or indicate energy of incoming high-energetic particles absorbed into different parts of the body. For example, the response can indicate a change in incoming high-energy particle flux distribution as a response to material properties at a certain distance from source in the biological structure. In response to or concurrently with absorption, the response can include a backscatter effect in which a portion of the particles are reflected back toward the surface of the biological structure and in the direction of application of the dose.

The interlayer link engine 230 can couple various layers of one or more neural networks at one or more inputs and outputs thereof. For example, the interlayer link engine 230 can link layers of a particular neural network in an order corresponding to a distance from source order of layers of the particular neural network. The interlayer link engine 230 can include a non-linear forward linker 232, and a linear forward linker 234. The non-linear forward linker 232 can link one or more non-linear blocks in an order corresponding to a distance from source order of layers of the non-linear neural network. The non-linear forward linker 232 can link an output of a first non-linear block with an input of a second non-linear block having a greater distance from source or the next-greatest distance from source than the first non-linear block. The linear forward linker 234 can link one or more linear blocks in an order corresponding to a distance from source order of layers of the linear neural network. The linear forward linker 234 can link an output of a first linear block with an input of a second linear block having a greater distance from source or the next-greatest distance from source than the first linear block.

The interblock link engine 240 can couple various blocks of a non-linear or linear neural network with various blocks of a non-linear or linear neural network at one or more inputs and outputs thereof, within a particular neural network. The interblock link engine 240 can include a non-linear feedback linker 242 and a linear feedback linker 244. The non-linear feedback linker 242 can link one or more non-linear blocks in an order corresponding to a reverse depth order of layers of the non-linear neural network. The non-linear feedback linker 242 can link an output of a first non-linear block with an input of a second non-linear block having a lower depth or the next-lowest depth than the first non-linear block. The linear feedback linker 244 can link one or more linear blocks in an order corresponding to a reverse depth order of layers of the linear neural network. The linear feedback linker 244 can link an output of a first linear block with an input of a second linear block having a lower depth or the next-lowest depth than the first linear block.

The backscatter link engine 250 can couple various blocks of a non-linear neural network with various blocks of a linear neural network at one or more inputs and outputs thereof, across distinct neural networks. For example, the backscatter link engine 250 can couple an output of a non-linear block corresponding to a material response of a biological structures to a linear block to modify an input fluence corresponding to a particular block. The backscatter link engine 250 can include an image depth processor 252, a fluence depth processor 254, and an inter-network feedback linker 256.

The image depth processor 252 can identify a depth metric corresponding to a particular non-linear block. For example, the image depth processor 252 can identify a depth metric corresponding to a z-index or a depth in millimeters. For example, the image depth processor 252 can identify one or more non-linear blocks associated with a particular depth metric, or range of depth metrics where a slicing resolution of an image map is greater than a slicing resolution of a fluence map. The fluence depth processor 254 can identify a depth metric corresponding to a particular linear block. For example, the fluence depth processor 254 can identify a depth metric corresponding to a z-index or a depth in millimeters. For example, the fluence depth processor 254 can identify one or more linear blocks associated with a particular depth metric, or range of depth metrics where a slicing resolution of a fluence map is greater than a slicing resolution of an image map.

The inter-network feedback linker 256 can generate a link between one or more non-linear blocks and one or more linear blocks. The inter-network feedback linker 256 can generate a link based on one or more of a depth metric generated by the image depth processor 252 and a depth metric generated by the fluence depth processor 254. For example, the inter-network feedback linker 256 can link a linear block having a first depth metric with a non-linear block having a second depth metric. The inter-network feedback linker 256 can identify an offset metric corresponding to an offset between depth metrics, and can generate links between nonlinear and linear blocks based on the offset metric. For example, an offset metric can correspond to a particular distance in millimeters. The inter-network feedback linker 256 can link one or more non-linear blocks at a reference depth with one or more linear blocks at a lower or higher depth based on a difference between the reference depth and the offset metric.

The dose map generator 260 can generate a model of distribution of radiation by one or more radiation emitting devices, based on output of one or more non-linear blocks and linear blocks of one or more neural networks. The neural network engine 262 can execute one or more neural network models. The neural network engine 262 can be configured to execute one or more non-linear neural network models and one or more linear neural network models. For example, the neural network engine 262 can concurrently or simultaneously execute one or more linear neural network models and one or more linear neural network models. The inter-network engine 264 can transmit communication via links between one or more blocks of one or more neural networks. For example, the inter-network engine 264 can transmit communication between blocks of a linear neural network and blocks of a non-linear neural network. The inter-network engine 264 can transmit communication via links between one or more blocks of one or more neural networks concurrently during operation of one or more neural networks linked with each at one or more blocks. For example, the inter-network engine 264 can coordinate execution and scheduling of execution of various blocks of one or more neural network models, based on a sequence of execution defined by links between blocks, or identified by the inter-network engine 264 via links between blocks.

Figure 3:
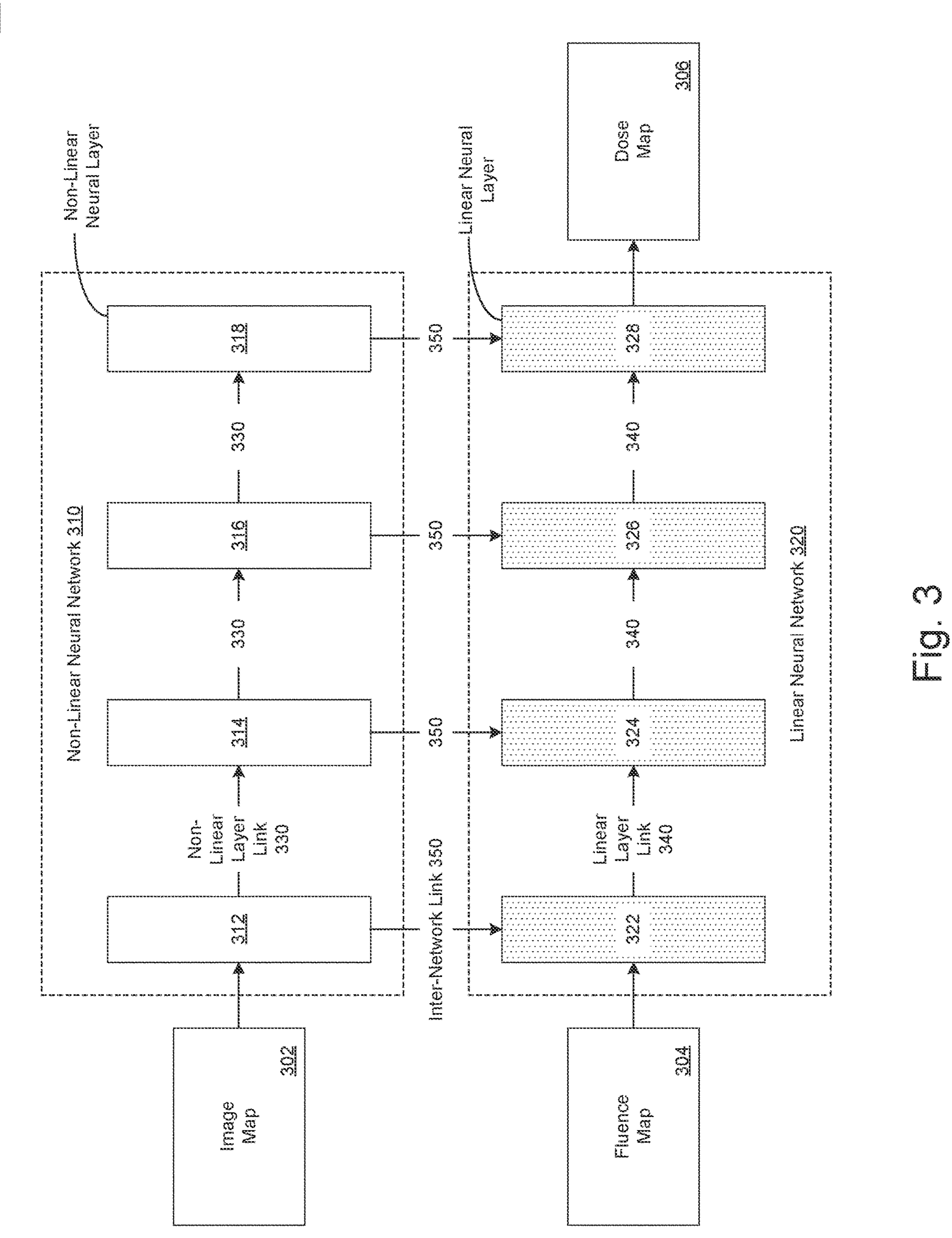
FIG. 3 depicts an example neural network system, in accordance with present implementations.

FIG. 3 depicts an example neural network system, in accordance with present implementations. As illustrated by way of example in FIG. 3, an example neural network system 300 can include at least an image map 302, a fluence map 304, a dose map 306, a non-linear neural network 310, a linear neural network 320, and an inter-network links 350.

The image map 302 can include, for example, a plurality of two-dimensional (2D) images. For example, each of the 2D images can respectively correspond to a substantially 2D plane of a 3D volume. The 3D volume can correspond to a biological structure as discussed herein. For example, a substantially 2D plane can correspond to a 3D volume having a depth layer at a particular slicing resolution of a sensor device. For example, a slicing resolution can be, but is not limited to, 1 mm. The image map 302 can correspond to a plurality of 2D images each indicating a portion of the 3D volume at a particular position within the 3D volume corresponding to the slicing resolution and an ordering of the 2D images. Thus, the image map 302 can include a plurality of 2D images each indicating a plane and positioned at a particular depth in the 3D volume, and identifying one or more biological features within the biological structure. For example, biological features can include position and density of bones, tissues, tendons, cancers, or any combination thereof.

The fluence map 304 can include, for example, a plurality of 2D bitmaps. For example, each of the 2D bitmaps can respectively correspond to a substantially 2D plane of a 3D volume. For example, a substantially 2D plane can correspond to a 3D volume having a depth layer at a particular slicing resolution of a sensor device. For example, a slicing resolution can be, but is not limited to, 0.01 mm. The slicing resolution of the fluence map 304 can correspond to the slicing resolution of the image map 302, or can be greater than or less than the slicing resolution of the image map 302. For example, where the slicing resolution of the fluence map 304 is greater than the slicing resolution of the image map 302, a plurality of fluence map layers, or 2D bitmaps of the fluence map 304, can be linked with a single image map layer corresponding to the range of depths of the 2D bitmaps of the fluence layer. For example, where the slicing resolution of the fluence map 304 is less than the slicing resolution of the image map 302, a plurality of image map layers can be linked with a single fluence map layer, or 2D bitmaps of the fluence map 304, corresponding to the range of depths of the 2D bitmaps of the fluence layer 304. For example, fluence maps can correspond to 2D objects describing energy density of particles passing through certain planes perpendicular to the beam, before the radiation reaches s patient or other medium.

The fluence map 304 can correspond to a plurality of 2D images each indicating a portion of the 3D volume at a particular position within the 3D volume corresponding to the slicing resolution and an ordering of the 2D images. Thus, the fluence map 304 can include a plurality of 2D images each indicating a plane and positioned at a particular depth in the 3D volume, and identifying one or more responses at a particular location in the 3D volume. For example, the fluence map 304 can indicate a degree or direction of absorption, reflection, or transmission of radiation at a particular biological features in the 3D volume. The fluence map 304 is not limited to a particular type of radiation, and is not limited to fluence as a particular type of radiation. For example, the fluence map 304 can correspond to response to radiation by photons or protons, but is not limited thereto. Correspondingly, radiation emitting devices are not limited to emitting radiation limited to photons or protons.

The dose map 306 can correspond to one or more instructions to operate one or more radiation emitting devices. For example, the dose map generator 260 can output a dose map including a radiation intensity at one or more points of a 2D plane aligned with a 2D plane of one or more 2D images or 2D bitmaps as discussed herein. The dose map generator 260 can generate a dose map that provides instructions for a plurality of radiation emitting devices. Thus, this technical solution can include at least the technical improvement of generating a dose map concurrently or simultaneously for a plurality of radiation emitting devices of, for example, an array of radiation emitting devices. This technical solution can provide at least the technical improvement of generating a dose map concurrently or simultaneously for a plurality of radiation emitting devices by a linear neural network configured to output linear transformations to fluence map input. Thus, the linear neural network can generate output corresponding to linear behavior of the array of radiation emitting devices, resulting in significantly reduced computations resources by avoiding or eliminating generation of dose maps on a per-emitting device basis, by non-linear neural networks that diverge in characterization from linear behavior of the radiation emitting devices. For example, radiation emitting devices can include one or more devices of 160. The dose map generator 260 can include a neural network engine 262, and an inter-network engine 264.

The non-linear neural network 310 can execute a neural network model including one or more linear blocks or layers as discussed herein. The non-linear neural network 310 can include non-linear neural layers 312, 314, 316 and 318, and non-linear layer links 330. The non-linear neural network 310 is not limited to the number and arrangement of layers depicted and discussed herein by way of example, and can support any number of layers, including, for example, dozens, hundreds, or thousands of layers.

The non-linear neural layers 312, 314, 316 and 318 can correspond at least partially in one or more of structure and operation to non-linear blocks or layers discussed herein. Each of the non-linear neural layers 312, 314, 316 and 318 can be linked by the non-linear layer links 330 in a cascade structure, or sequence structure. Each of the non-linear neural layers 312, 314, 316 and 318 can correspond to a particular depth or range of depths in a 3D volume with respect to a biological structure. For example, the non-linear neural layer 312 can correspond to a lowest depth of a 3D volume, and can correspond to a surface of a biological structure. For example, a surface of a biological structure can include skin, or a surface of a patient or organism exposed to or in contact with an ambient environment external to the patient or organism. For example, the non-linear neural layer 318 can correspond to a greatest depth of a 3D volume, and can correspond to an interior of a biological structure. For example, an interior of a biological structure can include a depth of a biological structure of a patient or organism at or beyond which radiation by one or more radiation emitting devices can transmit or reach. The non-linear neural layer 314 can correspond to a depth greater than a depth corresponding to the non-linear neural layer 312 and less than a depth corresponding to the non-linear neural layers 316 and 318. The non-linear neural layer 316 can correspond to a depth greater than a depth corresponding to the non-linear neural layers 312 and 314 and less than a depth corresponding to the non-linear neural layer 318. The non-linear layer links 330 can include communication paths, channels, addresses, or any combination thereof, for example, to transmit output between non-linear neural layers 312, 314, 316 and 318. For example, the layer of the first model can correspond to a two-dimensional portion of the distribution of matter at a first depth within the distribution of matter.

The layer 312 can correspond to a shortest predetermined distance from a source of radiation. For example, The shortest predetermined distance can correspond to a point where a surface of the patient is reached at any point. Thus, the layer 312 and the arrangement of layers 312, 322, 324, and 328 can vary in index or number to account for a surface of a patient that is not flat or has varying distance from the source at varying points along the surface.

The linear neural network 320 can execute a neural network model including one or more linear blocks or layers as discussed herein. For example, the linear neural network 320 can calculate the cost gradient back-propagation to the fluence plain. The linear neural network 320 can support automatic gradient calculation with respect to training the neural network. For example, the gradient calculation corresponding to the linear neural network 320 can be distinct from the gradient calculation corresponding to the non-linear neural network 310. The linear neural network 320 can include linear neural layers 322, 324, 326 and 328, and linear layer links 340.

The linear neural layers 322, 324, 326 and 328 can correspond at least partially in one or more of structure and operation to linear blocks or layers discussed herein. Each of the linear neural layers 322, 324, 326 and 328 can be linked by the linear layer links 340 in a cascade structure, or sequence structure. Each of the linear neural layers 322, 324, 326 and 328 can correspond to a particular distance from source, ranges of distances from the source, in a 3D volume with respect to a biological structure. For example, the linear neural layer 322 can correspond to a lowest distance from source of a 3D volume, and can correspond to radiation output through a volume having a slicing resolution extending from surface of a biological structure into the biological structure. For example, the linear neural layer 328 can correspond to a greatest distance from source of a 3D volume, and can correspond to radiation at an interior of a biological structure. The non-linear neural layer 324 can correspond to a distance from source greater than a distance from source corresponding to the non-linear neural layer 322 and less than a distance from source corresponding to the non-linear neural layers 326 and 328. The non-linear neural layer 326 can correspond to a distance from source greater than a distance from source corresponding to the non-linear neural layers 322 and 324 and less than a distance from source corresponding to the non-linear neural layer 328. The linear layer links 340 can include communication paths, channels, addresses, or any combination thereof, for example, to transmit output between linear neural layers 322, 324, 326 and 328.

For example, the layer of the second model can correspond to a two-dimensional portion of the distribution of energy at the first distance from source within the distribution of matter. For example, the layer of the second model can correspond to a two-dimensional portion of the distribution of energy at a second distance from source within the distribution of matter. For example, the first distance from source can be greater than the second distance from source. For example, one or more of the first neural network and the second neural network can correspond to a recursive neural network.

For example, one or more of the non-linear neural network 310 and the linear neural network 320 can correspond to a recursive neural network. The recursive neural network can obtain information from one layer at a time when proceeding away from the radiation source along the beam direction, according to a direction from layers 312 and 322 toward layers 318 and 328. For example, if the patient image is interpolated to a divergent coordinate system where a z-axis follows the beam center line and extends in the distance from source direction discussed herein, the 3D dose can be constructed one z-plane at a time starting from the source or a first z-plane from a source where non-zero patient density is observed. For example, a source can correspond to a fluence map. For example, a first z-plane can correspond to layers 312 and 322. This technical solution can provide a technical improvement by reducing computation from a 3D volume to a series of 2D planes, and can operate under a system behavior of the radiation emitting devices in which the radiation energy primarily dissipates forward to lower distance from sources. The inter-network links 350 can include communication paths, channels, addresses, or any combination thereof, for example, to transmit output between corresponding non-linear neural layers 312, 314, 316 and 318, and linear neural layers 322, 324, 326 and 328.

Figure 4:
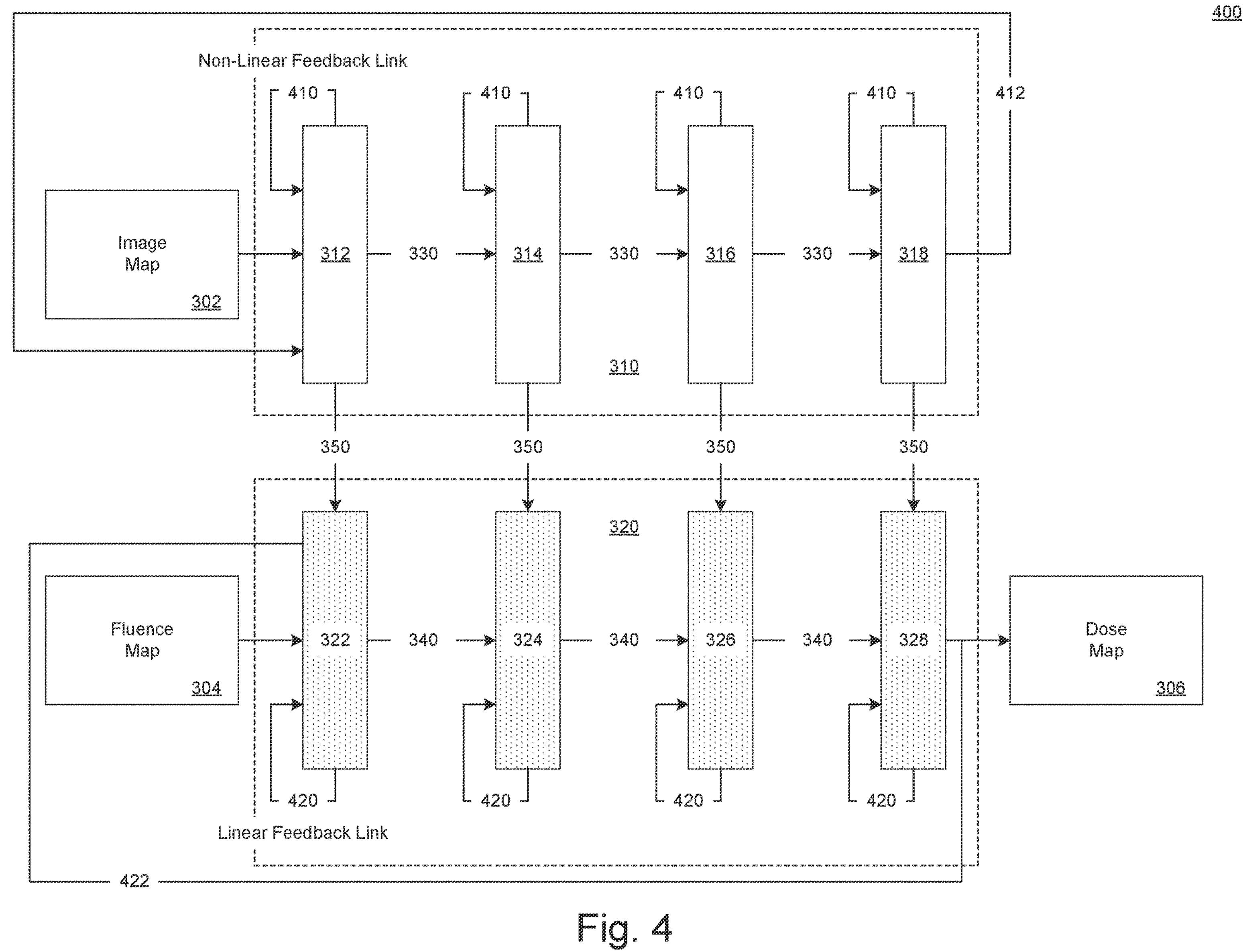
FIG. 4 depicts an example neural network system including inter-layer feedback, in accordance with present implementations.

FIG. 4 depicts an example neural network system including inter-layer feedback, in accordance with present implementations. As illustrated by way of example in FIG. 4, an example neural network system including inter-layer feedback 400 can include at least a non-linear feedback link 410, a non-linear network feedback link 412, a linear feedback link 420, and a linear network feedback link 422.

The non-linear feedback link 410 can communicate output from a particular non-linear layer among the non-linear neural layers 312, 314, 316 and 318 to an input of that same non-linear neural layer, or any layer having a distance from source less than the particular non-linear layer. The non-linear feedback link 410 can communicate a modification to a state of a biological structure or features from a particular non-linear layer among the non-linear neural layers 312, 314, 316 and 318. For example, the non-linear feedback link 410 can communicate a change in radiation transmissivity of a biological feature such as tissue. For example, the system can input, to the layer of the second model, a non-linear feedback corresponding to the non-linear output, the non-linear feedback corresponding to a response by the distribution of matter to the distribution of energy. The change in radiation can be added to the linear layer or combined according to a function corresponding to the biological structure or the 2D image generating the output. For example, the system can input, to the layer of the first model, a non-linear feedback corresponding to the nonlinear output.

The non-linear network feedback link 412 can communicate output from the non-linear neural layer 318 to an input of the non-linear neural layer 312. The non-linear network feedback link 412 can correspond at least partially in one or more of structure and operation to the non-linear feedback link 410. For example, the non-linear network feedback link 412 can communicate output from a last layer of the non-linear neural network 310 corresponding to a sequential order or cascade order corresponding to the non-linear neural layers 312, 314, 316 and 318 via the non-linear layer links 330. For example, the non-linear network feedback link 412 can communicate input to a first layer of the non-linear neural network 310 corresponding to a sequential order or cascade order corresponding to the non-linear neural layers 312, 314, 316 and 318 via the non-linear layer links 330.

The linear feedback link 420 can communicate output from a particular linear layer among the non-linear neural layers 322, 324, 326 and 328 to an input of that same linear neural layer, or any layer having a distance from source less than the particular linear layer. The linear feedback link 420 can communicate a modification to a dose map output from a particular linear layer among the linear neural layers 322, 324, 326 and 328. For example, the linear feedback link 420 can communicate a change in radiation output based on an increase or saturation of energy absorption at a particular layer. For example, the system can input, to the layer of the second model, a linear feedback corresponding to the linear output.

The linear network feedback link 422 can communicate output from the linear neural layer 328 to an input of the linear neural layer 322. The linear network feedback link 422 can correspond at least partially in one or more of structure and operation to the linear feedback link 420. For example, the linear network feedback link 422 can communicate output from a last layer of the linear neural network 320 corresponding to a sequential order or cascade order corresponding to the linear neural layers 322, 324, 326 and 328 via the linear layer links 340. For example, the linear network feedback link 422 can communicate input to a first layer of the linear neural network 320 corresponding to a sequential order or cascade order corresponding to the linear neural layers 322, 324, 326 and 328 via the non-linear layer links 340.

Figure 5:
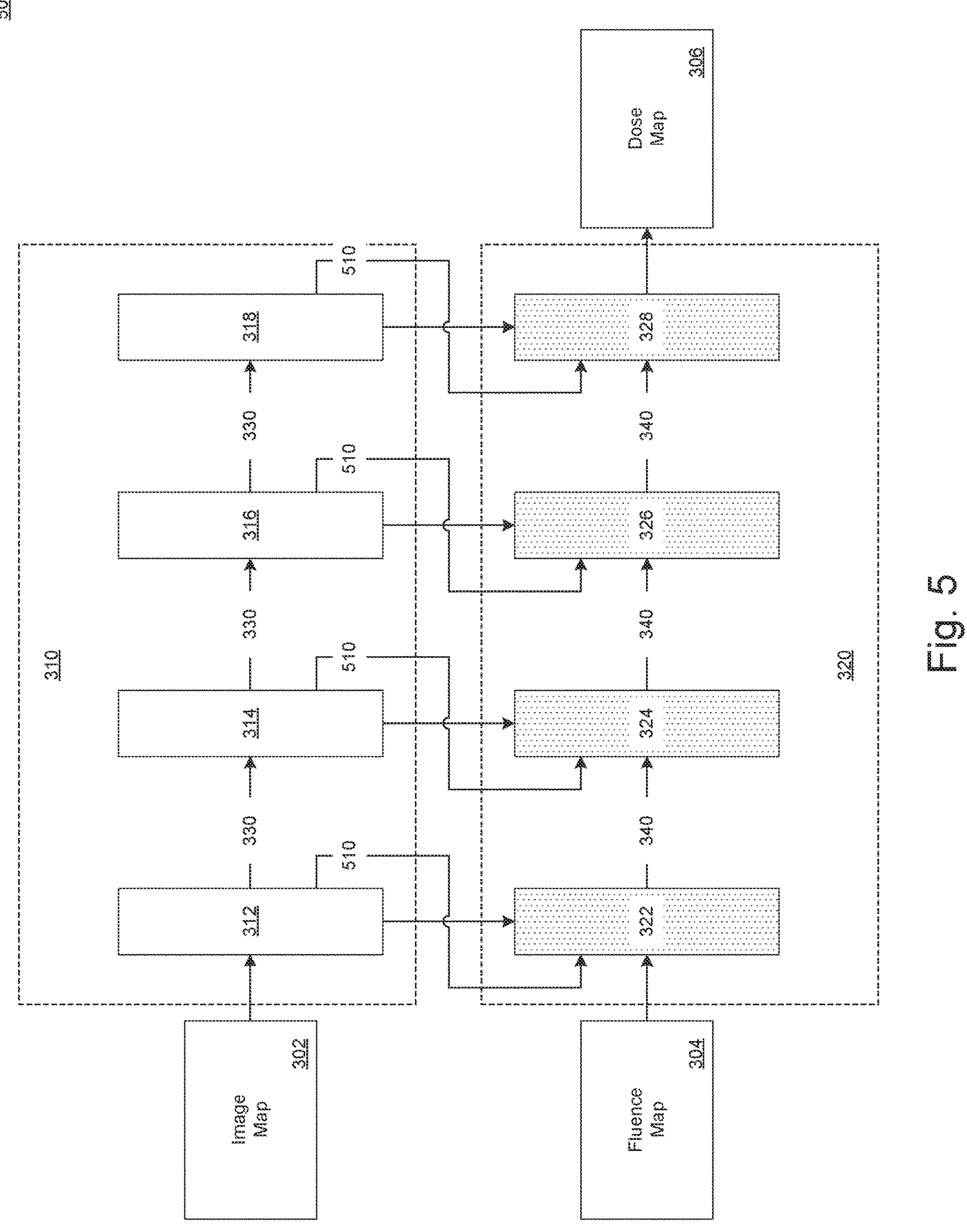
FIG. 5 depicts an example neural network system including inter-network feedback, in accordance with present implementations.

FIG. 5 depicts an example neural network system including inter-network feedback, in accordance with present implementations. As illustrated by way of example in FIG. 5, an example neural network system including inter-network feedback 500 can include at least an inter-network links 510. The inter-network links 510 can communicate output from a particular non-linear layer among the non-linear neural layers 312, 314, 316 and 318 to an input of a particular linear layer among the linear neural layers 322, 324, 326 and 328 having a distance from source less than the particular non-linear layer. The inter-network links 510 can thus correspond to a backscatter effect of radiation traveling in a decreasing distance from source direction through a biological structure opposite or counter to a direction of radiation emission by a radiation emitting device.

Figure 6:
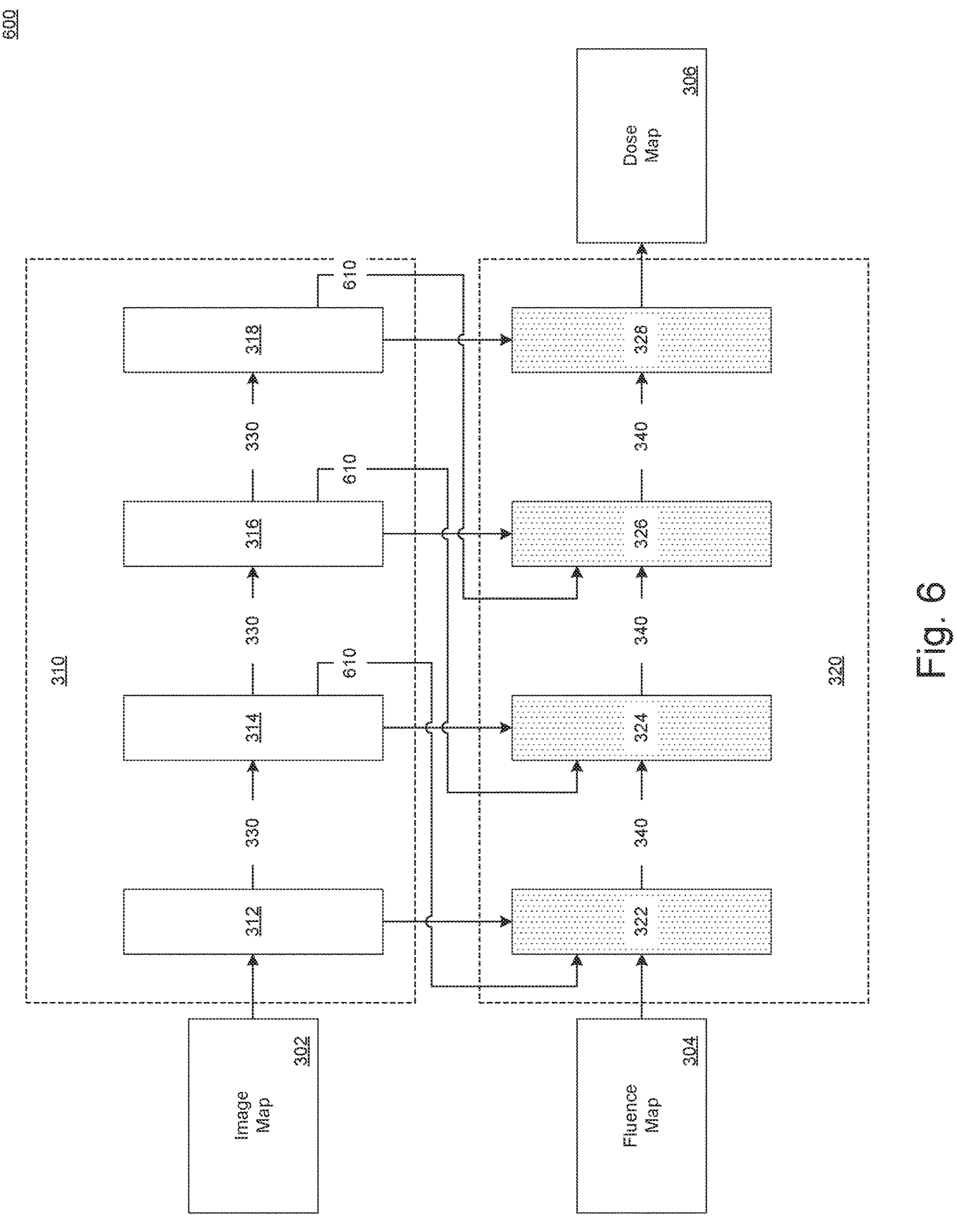
FIG. 6 depicts an example neural network system including offset inter-network feedback, in accordance with present implementations.

FIG. 6 depicts an example neural network system including offset inter-network feedback, in accordance with present implementations. As illustrated by way of example in FIG. 6, an example neural network system including offset inter-network feedback 600 can include at least an inter-network links 610. The inter-network links 610 can correspond at least partially in one or more of structure and operation to the inter-network links 510. The inter-network links 610 can have an offset greater than an offset corresponding to the inter-network links 510. Thus, the inter-network links 610 can provide feedback corresponding to a backscatter effect exceeding a backscatter effect corresponding to the inter-network links 510. This technical solution is not limited to the particular links illustrated herein, and can include any combination, permutation, superset, or subset of the links illustrated herein.

FIGS. 3-6 depict illustrative examples, and are not limited to the particular configurations, links, layers, or networks depicted therein by way of example. This technical solution is not limited to the links 330, 340, 350, 410, 412, 420, 422, 510, 610. For example, this technical solution can include any one or more of the links 330, 340, 410, 412, 420, 422, 510, 610, or combination, subset, or permutation thereof. For example, this technical solution can omit any one or more of the links 330, 340, 350, 410, 412, 420, 422, 510, 610 or combination, subset, or permutation thereof. Thus, this technical solution is not limited to the examples of FIGS. 3-6 and the links 330, 340, 350, 410, 412, 420, 422, 510, 610 depicted therein.

Figure 7:
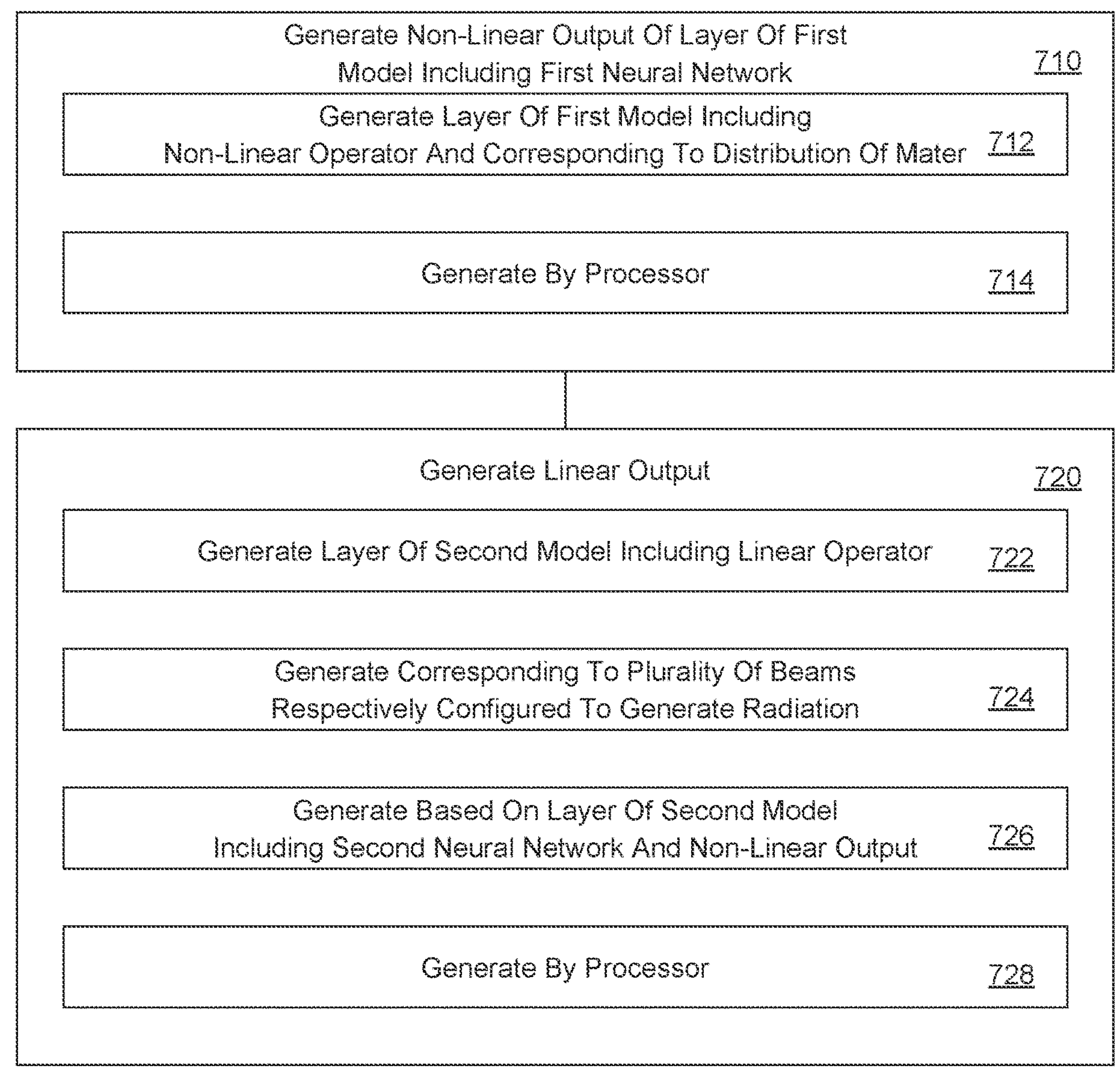
FIG. 7 depicts an example method of generation and application of radiation dosage based on a neural network architecture, in accordance with present implementations.

FIG. 7 depicts an example method of executing a neural network according to one or more radiation emitting devices, in accordance with present implementations. At least the system 100 can perform method 700.

At 710, the method 700 can generate a non-linear output of a layer of a first model including a first neural network. For example, the layer of the first model can correspond to a two-dimensional portion of the distribution of matter at a first distance from source within the distribution of matter. At 712, the method 700 can generate the layer of the first model including a non-linear operator and corresponding to a distribution of matter. For example, the method can include inputting, by the processor to the layer of the first model, a non-linear feedback corresponding to the non-linear output. For example, the method can include inputting, by the processor to the layer of the second model, a non-linear feedback corresponding to the non-linear output, the non-linear feedback corresponding to a response by the distribution of matter to the distribution of energy. At 714, the method 700 can generate a non-linear output of a layer of a first model by a processor.

At 720, the method 700 can generate a linear output. For example, the layer of the second model can correspond to a two-dimensional portion of the distribution of energy at the first distance from source within the distribution of matter. For example, the layer of the second model can correspond to a two-dimensional portion of the distribution of energy at a second distance from source within the distribution of matter. For example, the first distance from source can be greater than the second distance from source. At 722, the method 700 can generate the layer of the second model including a linear operator. For example, the method can include inputting, by the processor to the layer of the second model, a linear feedback corresponding to the linear output. At 724, the method 700 can generate a linear output corresponding to a plurality of beams respectively configured to generate radiation. At 726, the method 700 can generate a linear output based on a layer of a second model including a second neural network and the non-linear output. At 728, the method 700 can generate a linear output by the processor. For example, one or more of the first neural network and the second neural network can correspond to a recursive neural network.

Figure 8:
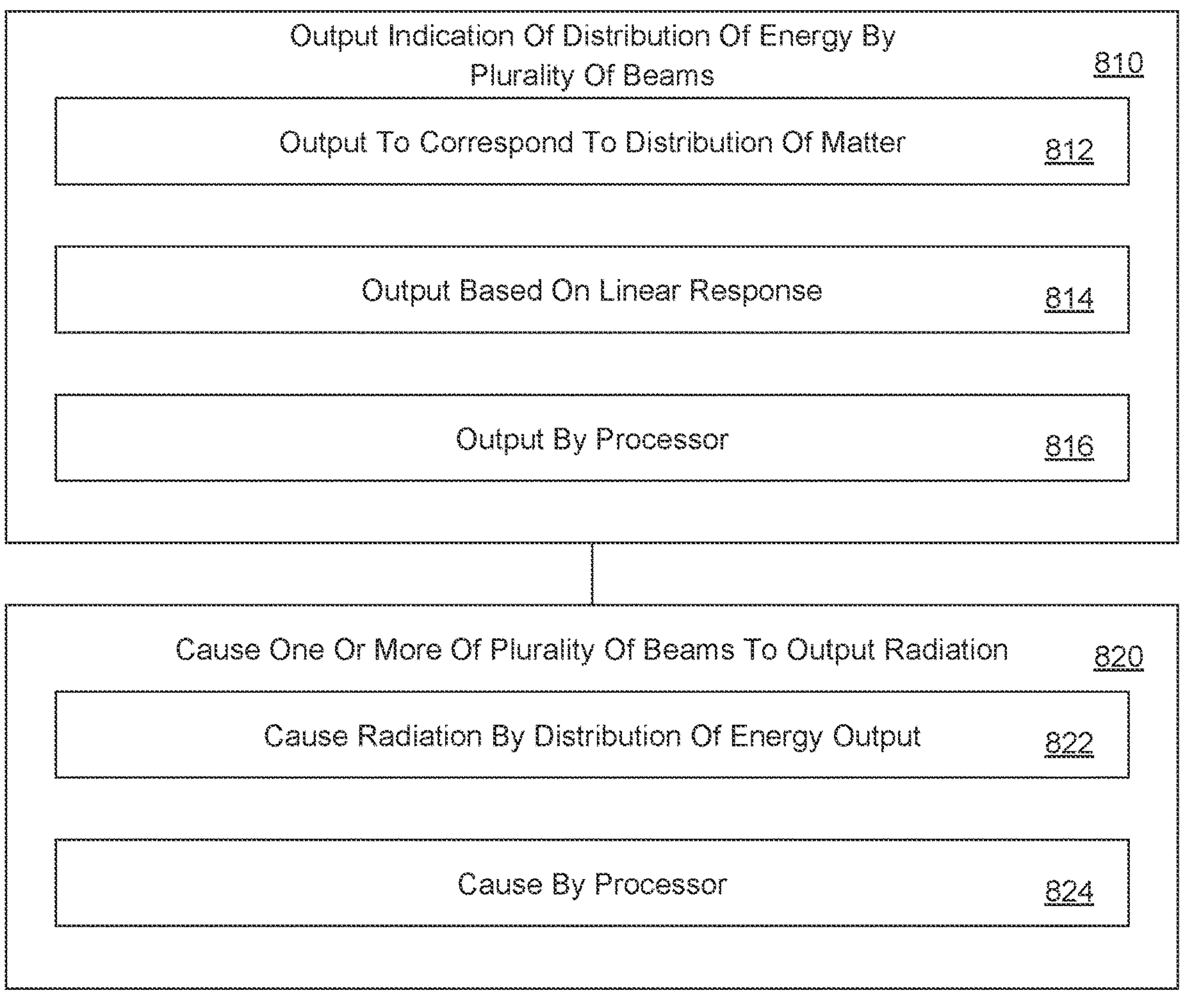
FIG. 8 depicts an example method of generation and application of radiation dosage based on a neural network architecture, in accordance with present implementations.

FIG. 8 depicts an example method of causing operation of or operating one or more radiation emitting devices based on a neural network, in accordance with present implementations. At least the system 100 can perform method 800. At 810, the method 800 can output an indication of a distribution of energy by the plurality of beams. At 812, the method 800 can output an indication of a distribution of energy to correspond to the distribution of matter. At 814, the method 800 can output based on the linear response. At 816, the method 800 can output an indication of a distribution of energy by the processor. At 820, the method 800 can cause one or more of the plurality of beams to output radiation. At 822, the method 800 can cause one or more of the plurality of beams to output radiation according to the distribution of energy output. At 824, the method 800 can cause one or more of the plurality of beams to output radiation by the processor.

FIG. 9 depicts an example method of generation and application of radiation dosage based on a neural network architecture, in accordance with present implementations. At least the system 100 can perform method 800. At 910, the method 900 can include generating, by a processor, a non-linear output of a layer of a first model including a first neural network, the layer of the first model including a non-linear operator and corresponding to a distribution of matter. At 920, the method 900 can include generating, by the processor, a linear output based on a layer of a second model including a second neural network and the non-linear output, the layer of the second model including a linear operator and corresponding to a plurality of beams respectively configured to generate radiation. At 930, the method 900 can include outputting, by the processor and based on the linear response, an indication of a distribution of energy output by the plurality of beams to correspond to the distribution of matter. At 940, the method 900 can include causing, by the processor, one or more of the plurality of beams to output radiation according to the distribution of energy output.

For example, the system can input, to the layer of the first model, a non-linear feedback corresponding to the non-linear output. The system can input, to the layer of the second model, a linear feedback corresponding to the linear. The system can input, to the layer of the second model, a non-linear feedback corresponding to the non-linear output, the non-linear feedback corresponding to a response by the distribution of matter to the distribution of energy.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items. References to "is" or "are" may be construed as non-limiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the appended claims includes equivalents to the meaning and scope of the appended claims.

What is claimed is:

1. A method, comprising:

generating, by a processor, a non-linear output of a layer of a first model including a first neural network, the layer of the first model including a non-linear operator and corresponding to a distribution of matter;

generating, by the processor, a linear output based on a layer of a second model including a second neural network and the non-linear output, the layer of the second model including a linear operator and corresponding to a plurality of beams respectively configured to generate radiation, wherein the linear output is proportional to a fluence input to the second neural network;

outputting, by the processor and based on the linear output, an indication of a distribution of energy output by the plurality of beams to correspond to the distribution of matter; and causing, by the processor, one or more of the plurality of beams to output radiation according to the distribution of energy output.

2. The method of claim 1, further comprising:

inputting, by the processor to the layer of the first model, a non-linear feedback corresponding to the non-linear output.

3. The method of claim 1, further comprising:

inputting, by the processor to the layer of the second model, a linear feedback corresponding to the linear output.

4. The method of claim 1, further comprising;

inputting, by the processor to the layer of the second model, a non-linear feedback corresponding to the non-linear output, the non-linear feedback corresponding to a response by the distribution of matter to the distribution of energy.

5. The method of claim 1, wherein the layer of the first model corresponds to a two-dimensional portion of the distribution of matter at a first distance from source within the distribution of matter.

6. The method of claim 5, wherein the layer of the second model corresponds to a two-dimensional portion of the distribution of energy at the first distance from source within the distribution of matter.

7. The method of claim 5, wherein the layer of the second model corresponds to a two-dimensional portion of the distribution of energy at a second distance from source within the distribution of matter.

8. The method of claim 7, wherein the first distance from source is greater than the second distance from source.

9. The method of claim 1, wherein one or more of the first neural network and the second neural network correspond to a recursive neural network.

10. A system, comprising:

a server comprising a processor and a non-transitory computer-readable medium containing instructions that when executed by the processor causes the processor to:

generate a non-linear output of a layer of a first model including a first neural network, the layer of the first model including a non-linear operator and corresponding to a distribution of matter;

generate a linear output based on a layer of a second model including a second neural network and the non-linear output, the layer of the second model including a linear operator and corresponding to a plurality of beams respectively configured to generate radiation, wherein the linear output is proportional to a fluence input to the second neural network;

output, based on the linear output, an indication of a distribution of energy output by the plurality of beams to correspond to the distribution of matter; and cause one or more of the plurality of beams to output radiation according to the distribution of energy output.

11. The system of claim 10, the processor further configured to:

input, to the layer of the first model, a non-linear feedback corresponding to the non-linear output.

12. The system of claim 10, the processor further configured to:

input, to the layer of the second model, a linear feedback corresponding to the linear output.

13. The system of claim 10, the processor further configured to:

input, to the layer of the second model, a non-linear feedback corresponding to the non-linear output, the non-linear feedback corresponding to a response by the distribution of matter to the distribution of energy.

14. The system of claim 10, wherein the layer of the first model corresponds to a two-dimensional portion of the distribution of matter at a first distance from source within the distribution of matter.

15. The system of claim 14, wherein the layer of the second model corresponds to a two-dimensional portion of the distribution of energy at the first distance from source within the distribution of matter.

16. The system of claim 14, wherein the layer of the second model corresponds to a two-dimensional portion of the distribution of energy at a second distance from source within the distribution of matter.

17. The system of claim 16, wherein the first distance from source is greater than the second distance from source.

18. The system of claim 10, wherein one or more of the first neural network and the second neural network correspond to a recursive neural network.

19. A system comprising:

a computer in communication with a server and configured to display a graphical user interface;

a radiotherapy machine in communication with the server; and the server configured to:

generate a non-linear output of a layer of a first model including a first neural network, the layer of the first model including a non-linear operator and corresponding to a distribution of matter;

generate a linear output based on a layer of a second model including a second neural network and the non-linear output, the layer of the second model including a linear operator and corresponding to a plurality of beams respectively configured to generate radiation, wherein the linear output is proportional to a fluence input to the second neural network;

output, based on the linear output, an indication of a distribution of energy output by the plurality of beams to correspond to the distribution of matter; and cause one or more of the plurality of beams to output radiation according to the distribution of energy output.

20. The system of claim 19, the computer further configured to:

input, to the layer of the first model, a non-linear feedback corresponding to the non-linear output;

input, to the layer of the second model, a linear feedback corresponding to the linear output; and input, to the layer of the second model, a non-linear feedback corresponding to the non-linear output, the non-linear feedback corresponding to a response by the distribution of matter to the distribution of energy.

* * * * *